Dec. 25, 1945.  C. KELLER  2,391,629
VARIABLE PITCH PROPELLER
Filed March 20, 1942   2 Sheets-Sheet 1

Inventor
Curt Keller
By
Attorneys

Dec. 25, 1945.  C. KELLER  2,391,629
VARIABLE PITCH PROPELLER
Filed March 20, 1942  2 Sheets-Sheet 2

Inventor
Curt Keller
By Dodge and Sims
Attorneys

Patented Dec. 25, 1945

2,391,629

UNITED STATES PATENT OFFICE 2,391,629

VARIABLE-PITCH PROPELLER

Curt Keller, Zurich, Switzerland, assignor to Escher Wyss Maschinenfabriken Aktiengesellschaft, Zurich, Switzerland, a corporation of Switzerland Application March 20, 1942, Serial No. 435,577
In Switzerland June 30/July 5, 1941

10 Claims. (Cl. 170—135.6)

This invention relates to means for the control of variable-pitch propellers, especially for aircraft, the pitch-adjustment of which is not confined to a normal, predetermined range but extends also beyond the limits of such range.

A variable pitch propeller must do more than simply convert the engine output into an appropriate propelling force, by adjustment of the pitch of its blades within a relatively small range.

For instance, in the case of variable-pitch propellers for aircraft it must also be possible to move the propeller blades beyond a normal, predetermined range into extreme end positions. Such positions are the feathered position and the braking position. However, the adjustment of the blades into these positions always involves a certain amount of risk when flying, if means are not provided to ensure that said positions can only be attained as a result of deliberate action on the part of the pilot and then will be attained expeditiously. If, for example, the blades of the variable-pitch propeller were by mistake moved into the braking position during normal flying conditions, the aircraft might be caused to crash. If, on the other hand, an intentional adjustment of the blades into one of the extreme end positions is not carried out with sufficient rapidity and whilst the driving engine runs at least throttled, an inadmissible increase in the engine speed might occur when the propeller blades are moved through certain angles of incidence. Another important requirement is that after the propeller has been set in braking position, some means must be provided to assure its return to a positive pitch position at least by the time it is subjected to governor control.

The object of this invention is to provide a controlling device of the kind referred to permitting the fulfilment of the foregoing requirements and also ensuring considerable simplifications of the controlling manoeuvre combined with simultaneous influencing of the engine output. To this end the controlling mechanism according to the present invention comprises means which ensure that the intentional manual adjustment by the pilot of a control member from positions in which this control member governs an adjustment of the propeller blades within a normal, predetermined range into positions in which the control member governs the adjustment of the blades within at least one braking position, is only possible after the driving engine has, at least, been previously considerably throttled, i. e. if it has at least been adjusted to a smaller load at reduced speed.

The accompanying drawings show, partly in a simplified manner of representation, and by way of example, a constructional embodiment of the subject matter of the invention. In these drawings, Fig. 1 is an axial longitudinal section through a variable-pitch propeller for aircraft provided with hydraulically actuated means for the adjustment of the blades, the driving engine of the propeller being also shown partly in an elevation view and partly in section.

Figure 1:
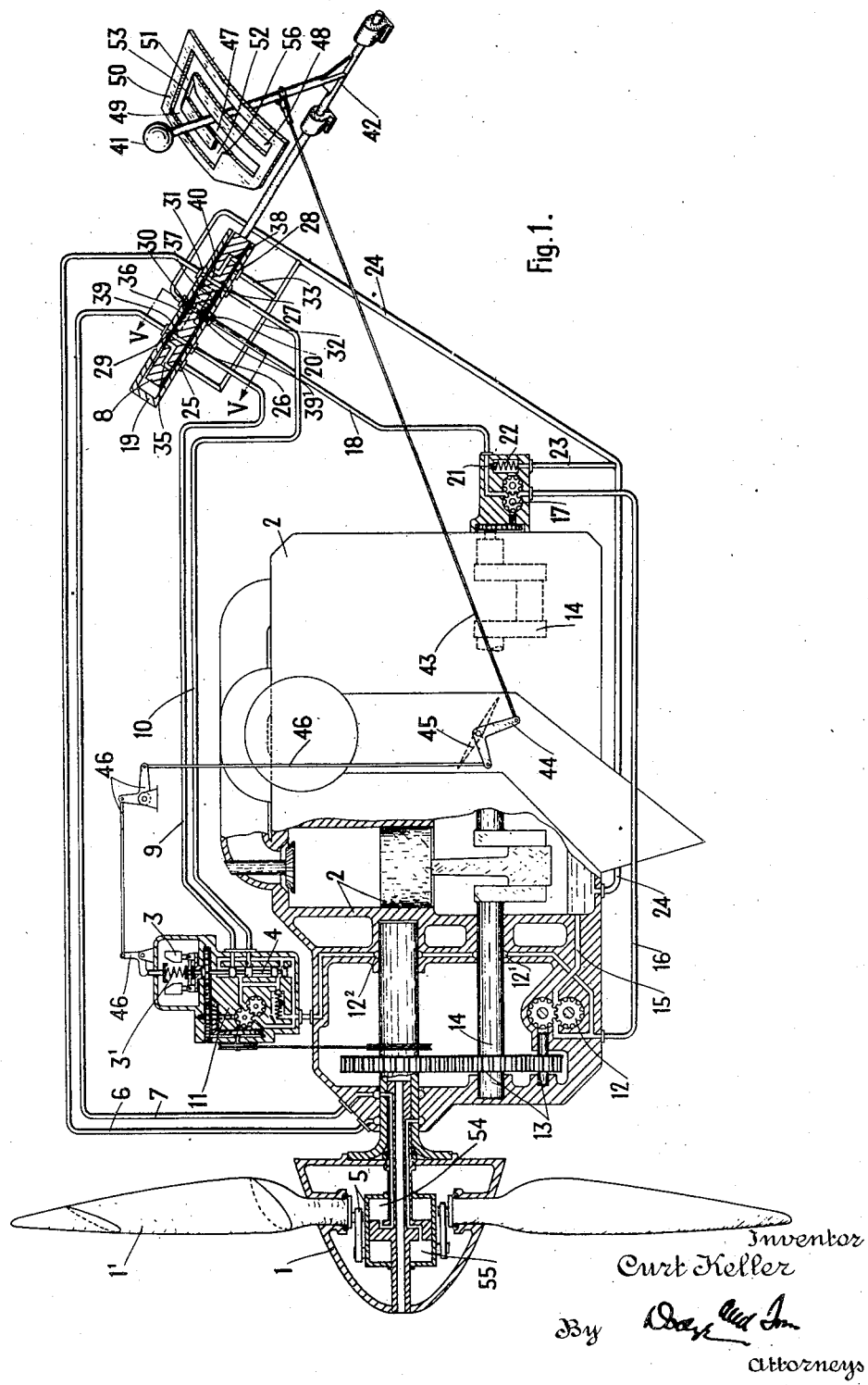

Referring to the drawings, I denotes the propeller comprising a hydraulically actuated mechanism for adjusting its blades $I^1$, and 2 designates the engine driving this propeller. 11 denotes a speed governor of known design which within a normal, predetermined range of adjustment automatically displaces the blades $I^1$ in such a manner that the driving engine 2, and therefore also the propeller I, runs approximately at constant speed. The speed governor 11 comprises a centrifugal pendulum 3 whose response is controlled by an adjustable loading spring 3'. The centrifugal pendulum controls a piston valve 4 which in turn controls a blade adjusting motor indicated at 5 as a double acting piston motor having opposed working spaces 54 and 55. The valve 4 when shifted reversely admits pressure fluid to either working space of the motor 5 while exhausting the other space. The governor 11 includes a gear pump for furnishing a hydraulic pressure liquid to the valve 4 and a loaded relief valve which limits the pressure of delivery.

The prior filed Keller application, Serial No. 334,443 illustrates a pressure motor control in which the governor control is limited to a normal adjustment range because it can deliver fluid only at a normal pressure. The motor can move into extreme feathering and braking positions only in response to higher pressures.

That scheme can be used with the present invention, but is not essential thereto. All that is required is that the governor 11 actuate the adjustable propeller within the normal pitch adjusting range and that its action be reasonably limited to such range.

The cylinder of motor 5 is the moving element and is shown linked to the adjustable blades 1'. The hydraulic connections between the two working spaces of motor 5 and the valve 4 of governor 11, are by way of pipes 6, 7, 9 and 10 and this communication is controlled by the valve 8 in housing 19 in a manner to be described.

A lubricating pump 12 driven by gear 13 from engine crank-shaft 14 draws oil from the engine crank case through passage 15 and discharges it under pressure through pipe 16 as well as to certain lubricated parts 12' and 12² and to the pump in governor 11. Pipe 16 leads to the intake of a second pump 17 which is also driven by the engine crank-shaft 14.

Pump 17 discharges through pipe 18 to connection 20 of valve casing 19. A valve 21 influenced by a spring 22 limits the pressure of the liquid in pipe 18 to a constant, predetermined magnitude since said liquid by-passes through the discharge pipes 23 and 24 to the casing of the engine 2 as soon as the pressure in the pipe 18 exceeds a value determined by spring 22. If the two-pressure scheme of the prior Keller application be used, this would be a pressure higher than that available at governor 11. In the casing 19 which accommodates the change-over valve 8 further channels 25, 26, 27, 28, 29, 30 and 31 are provided apart from the channel 20 already referred to. Channel 25 is connected through a discharge pipe 32 to the above mentioned pipe 24 leading to the casing of the engine 2, channel 26 to pipe 9, channel 27 to pipe 10 and channel 28 to pipe 33 communicating with discharge pipe 32. Furthermore channel 29 is connected to pipe 7, channel 30 to pipe 24 and channel 31 to pipe 6. In the change-over valve 8 a number of channels 35, 36, 37, 38, 39, 39¹ and 40 are provided.

Figure 5:
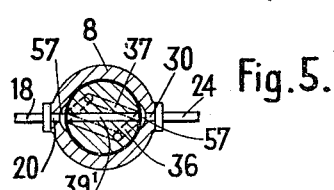
Fig. 5 is a section on the line V—V of Fig. 1.

The valve 8 is cylindrical and may rotate and also shift axially in the cylindrical casing. The axial motion establishes certain alternative connections. All the connections 20 and 25 to 31 inclusive have individual enlargements such as those shown at 57 in Fig. 5, and these maintain communication of the connections in the casing with the ports in the valve throughout the limited range of rotation of the valve. Such rotation is to permit actuation of the engine throttle and the governor loading spring as will be explained.

In the normal, longitudinal mid-position of the valve, port 39 connects pipes 7 and 9, port 40 connects pipes 6 and 10 and port 39' connects pipes 18 and 24 (via connection 30). Thus governor 11 is in control of motor 5 and pump 17 merely discharges to the engine crank case. In the embodiment illustrated, the normal position is the mid-position of the valve.

Figure 2:
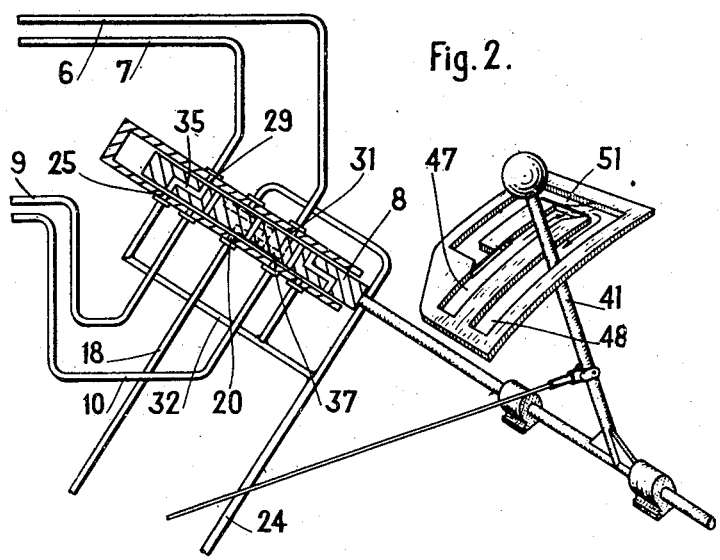
Fig. 2 shows certain parts of the hydraulically actuated pitch-adjusting mechanism in the position in which these parts must be brought before the blades can be moved into the braking positions.

If the shift is outward to the position of Fig. 2, pressure pipe 18 is connected to pipe 6 by port 37 and hence to space 55 of motor 5, while space 54 is connected to waste by pipe 7, port 35 and connection 25. The blades 1' thus move quickly to braking position.

Figure 3:
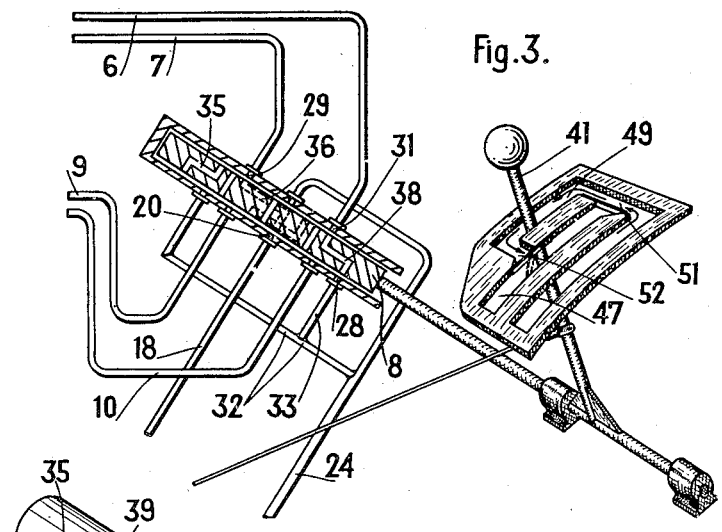
Fig. 3 shows the same parts in the position into which they have to be brought when the propeller blades are to be feathered.
Figure 4:
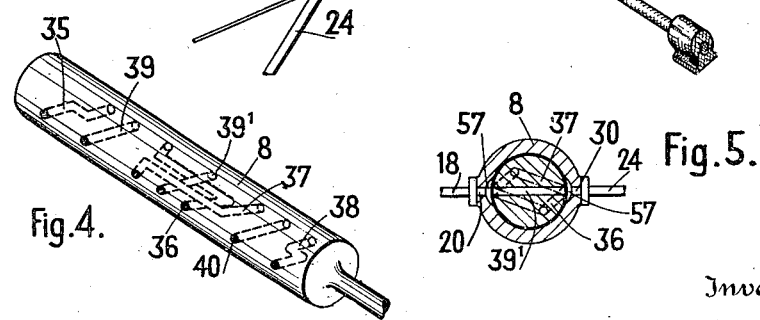
Fig. 4 shows a perspective view of a control member of the hydraulically actuated pitch-adjusting mechanism.

If the shift is inward (Fig. 3), pressure pipe 18 is connected to pipe 7 by port 36 so that working space 54 is put under pressure while space 55 is vented via 6, 38, 28, 24 to the engine crank case. The propeller blades 1' thus move quickly to feathering position.

The valve 8 is shifted axially (and in the illustrated embodiment is rotated) by a hand lever 41 fixed to shaft 42 which is coaxial with the valve and fixed thereto. The hand lever is connected by link 43 and bell-crank 44 with engine throttle 45 and further by the links and bell-cranks 46 with the loading spring 3' of governor 3.

The movements which can be imparted to the hand lever 41 are controlled by slots 47, 48 and 49 cut in a plate 50. The middle slot 47 is allotted to the normal, predetermined range of adjustment of the propeller blades 1¹, slot 48 allows an arbitrary displacement of the blades into a braking position and slot 49 an arbitrary displacement of the blades to a larger angle of incidence, i. e. into the feathered position. When moving the hand lever 41 in the longitudinal direction of one of these slots 47, 48 and 49, the position of the throttle valve 45 is altered and as a result hereof the output of the driving engine changed. On displacing the hand lever 41 in the slot 47 the controlling action of governor 11 is also influenced, whilst when adjusting the hand lever 41 within the other two slots 48 and 49 the speed governor 11 is put out of action by interruption of its hydraulic connection with motor 5 (see Figs. 2 and 3). Transverse slots 51 and 52 are also provided in the slot plate 50, slot 51 extending across the ends of all three longitudinal slots 47, 48 and 49. The connection between slot 47 and slot 51 is normally obstructed by a latch 53. This latch 53 only permits lever 41 to be moved from slot 47 into slot 51, but prevents a return movement of this lever 41 from the slot 51 directly into slot 47. Slot 52 is connected only to slots 49 and 47, near mid-length of the latter, and a latch 56 controls the connection between slot 52 and slot 47 in such a manner that the lever 41 can be moved from slot 52 into slot 47, but not from slot 47 into slot 52. As long as the lever 41 is guided in slot 51, the throttle valve 45 is adjusted in such a manner that the driving motor 2 is, at least, considerably throttled or even running on no-load.

The method of operation of the described control device is as follows:

In Fig. 1 the hand lever 41 is shown in a position in which it is guided by the slot 47. This corresponds to any given position of the propeller blades 1¹ within their normal, predetermined range of adjustment. The change-over valve 8 now connects the pipe 9 to pipe 7, whilst pipe 10 is connected to pipe 6 and pipe 18 to the discharge pipe 24. The liquid delivered by pump 17 now simply describes a short-circuited cycle through pipe 18, channels 20, 39¹, 30 and pipe 24, and the position of the blades 1¹ of the propeller 1 is controlled by the position of the fly-weights 3 of the speed governor 11. When adjusting the hand lever 41 in the longitudinal direction of slot 47, both the engine output as also the desired speed of the propeller 1 are changed, since the throttle valve 45 and at the same time the spring 3¹ of the speed governor 11 are set differently. If hereupon pressure medium flows under the control of the governor 11 through pipes 9, 7 and 10, 6 respectively, to the pitch-adjusting device 5 of the propeller 1, then the blades 1¹ of the latter will be adjusted into the position required for the new flying conditions.

When it is desired to move the propeller blades 1¹ into an extreme end position, the lever 41 must in all circumstances first be moved into slot 51. The movement of lever 41 into slot 51 results in the throttle valve 45 being adjusted into a position in which it at least considerably throttles the driving engine 2, if not even causing same to operate on no-load. Simultaneously the governor 11 is adjusted to respond at a smaller speed. From slot 51 the hand lever 41 can be moved either into slot 48 or into slot 49. From the foregoing it is apparent that a displacement of the hand lever 41 into the slots 48 and 49 is only possible through slot 51 and this always involves at least a considerable throttling of the driving engine 2 combined with a reduction in the speed of the latter. A transverse movement of the hand lever 41 in slot 51 and its subsequent shifting into slot 48 causes a displacement of the change-over valve 8 into the position shown in Fig. 2, whereby the latter is also caused to turn through a small angle, so that the pressure medium forced into pipe 18 then passes through channels 20, 37 and 31 into pipe 6 and from the latter into space 55 of the blade adjusting device. The latter is now operated in such a sense that a displacement of the blades 1¹ into their braking position takes place. At the same time pressure medium can flow out of the second space 54 of the adjusting device 5 through pipe 7, channels 29, 35, 25 and pipes 32, 24 into the casing of engine 2. During the transverse movement of hand lever 41 in slot 51 the change-over valve 8 is brought into the position shown in Fig. 3. Adjustment of lever 41 within slot 49 involves simultaneously a slight turning movement of valve 8, as a result of which the pressure medium supplied to pipe 18 gains access through channels 20, 36 and 29 to pipe 7 and from the latter to space 54 of the blade adjusting mechanism 5, thus causing a movement of the latter in the sense which is necessary for bringing the propeller blades 1¹ into their feathered position. At the same time pressure medium from space 55 is forced into pipe 6 and hereupon through channels 31, 38, 28 and pipes 33, 32 and 24 into the casing of engine 2.

The latches 53 and 56 ensure that the lever 41 can only be moved from slot 47 into slot 48 via slot 51, and from slot 48 back to slot 47 only via slot 52. In this manner the speed governor 11 is prevented from being switched-in before the blades 1¹ of the propeller 1 have reached a position within their normal, predetermined range of adjustment. If the governor could be placed in control while the blades were in braking position (negative pitch position) the governor would control in the reverse sense with disastrous results. This is inhibited by the fact that return to governor control is possible only by way of the blade feathering range.

What is claimed is:

1. The combination of an engine; a variable pitch propeller driven thereby; a motor for adjusting the pitch of said propeller; means for supplying pressure fluid for actuating said motor; a governor responsive to engine speed and capable of controlling said motor by admitting and exhausting pressure fluid to and from the same; an energy input controller for said engine; a valve having feathering and braking positions in which respectively it establishes connections for operating said motor in opposite directions and disconnects the governor from the motor, and a governing position in which it connects the governor in controlling relation with the motor; an actuator for said valve and said energy input controller; guide means for said actuator permitting motion thereof to vary energy input in three similar ranges entailing respectively the feathering, governing and braking positions of the valve; and means associated with the guide means serving to limit shift from the governing range to other ranges to a path entailing idling conditions for the engine and to prevent return to the governing range while the engine is idling.

2. The combination of an engine; a variable pitch propeller driven thereby; a motor for adjusting the pitch of said propeller; means for supplying pressure fluid for actuating said motor; a governor responsive to engine speed and capable of controlling said motor by admitting and exhausting pressure fluid to and from the same; an energy input controller for said engine; a valve having feathering and braking positions in which respectively it establishes connections for operating said motor in opposite directions and disconnects the governor from the motor, and a governing position in which it connects the governor in controlling relation with the motor; an actuator for said valve and said energy input controller; guide means for said actuator permitting motion thereof to vary energy input in three similar ranges entailing respectively the feathering, governing and braking positions of the valve; and means associated with the guide means to limit shift from the governing range to other ranges to a path entailing idling conditions for the engine, and limiting a return to the governing range to passage through at least a portion of the feathering range.

3. The combination of an engine; a variable pitch propeller driven thereby; a motor for adjusting the pitch of said propeller; means for supplying pressure fluid for actuating said motor; a governor responsive to engine speed and capable of controlling said motor by admitting and exhausting pressure fluid to and from the same; regulatory means comprising means for adjusting the control point of said governor and an energy input controller for the engine connected to be shifted concurrently in a chosen relation to one another; a valve having feathering and braking positions in which respectively it establishes connections for operating said motor in opposite directions and disconnects the governor from the motor, and a governing position in which it connects the governor in controlling relation with the motor; an actuator for said valve and said regulatory means; guide means for said actuator permitting motion thereof to vary energy input in three similar ranges entailing respectively the feathering, governing, and braking positions of the valve; and means associated with the guide means to limit shift from the governing range to other ranges to a path entailing idling conditions for the engine, and limiting return to the governing range to passage through at least a portion of the feathering range.

4. The combination of an engine; a variable pitch propeller driven thereby; a motor for adjusting the pitch of said propeller; a source of pressure fluid; a governor responsive to engine speed and capable of controlling admission and exhaust of pressure fluid from said source to and from said motor; an energy input controller for said engine; a second source of pressure fluid; a valve having feathering and braking positions in which it connects said second source of pressure fluid in reverse relations with said motor and disconnects said governor from the motor, and a governing position in which it disconnects said second source and connects the governor in controlling relation with the motor; an actuator for said valve and said energy input controller; guide means for said actuator permitting motion thereof to vary energy input in three similar ranges entailing respectively the feathering, governing and braking positions of the valve; and means associated with the guide means to limit shift from the governing range to other ranges to a path entailing idling conditions for the engine, and limiting return to the governing range to passage through at least a portion of the feathering range.

5. The combination of an engine; a variable pitch propeller driven thereby; a motor for adjusting the pitch of said propeller; a source of pressure fluid; a governor responsive to engine speed and capable of controlling the admission and exhaust of pressure fluid from said source to and from said motor; regulatory means comprising an energy input controller for said engine and adjusting means connected with said input controller and serving to vary the control point of the governor in a chosen relation to the adjustment of the energy input controller; a second source of pressure fluid; a valve having feathering and braking positions in which it connects said second source of pressure fluid in reverse relations with said motor and disconnects said governor from the motor, and the governing position in which it connects a governor in controlling relation with the motor; an actuator for said valve and regulatory means; guide means for said actuator permitting motion thereof to vary energy input in three similar ranges entailing respectively the feathering, governing and braking positions of the valve; and means associated with the guide means to limit shift from the governing range to other ranges to a path entailing idling conditions for the engine.

6. The combination of an engine; a variable pitch propeller driven thereby; a motor for adjusting the pitch of said propeller; a source of pressure fluid; a governor responsive to engine speed and capable of controlling the admission and exhaust of pressure fluid from said source to and from said motor; regulatory means comprising an energy input controller for said engine and adjusting means connected with said input controller and serving to vary the control point of the governor in a chosen relation to the adjustment of the energy input controller; a second source of pressure fluid; a valve having feathering and braking positions in which it connects said second source of pressure fluid in reverse relations with said motor and disconnects said governor from the motor, and a governing position in which it connects the governor in controlling relation with the motor; an actuator for said valve and regulatory means; guide means for said actuator permitting motion thereof to vary energy input in three similar ranges entailing respectively the feathering, governing and braking positions of the valve; and means associated with the guide means to limit shift from the governing range to other ranges to a path entailing idling conditions for the engine, and limiting return to the governing range to passage through at least a portion of the feathering range.

7. The combination of an engine; means for supplying pressure fluid; a propeller driven by the engine and having blades adjustable to vary the propeller pitch; a pressure motor normally serving to adjust the pitch of the blades within a limited working range but capable of moving said blades into extreme feathered and braking positions; a governor responsive to engine speed, supplied with pressure fluid from said source and controlling the motor through said limited working range; means for adjusting said governor to vary the speed at which it exercises control; an energy input controller for the engine; a valve having a governing position in which it connects the governor in controlling relation with the motor, and distinct feathering and braking positions in which, respectively, it disconnects the governor and establishes direct pressure fluid connections to operate the motor to feathering and braking positions respectively; a manually shiftable actuator connected with the input controller, the governor adjusting means, and said valve, and movable in a first direction to operate the controller and adjusting means, and in a second relatively transverse direction to shift the valve; a guide for said actuator defining three ranges all in the first direction, the ranges establishing the governing, feathering and braking positions of the valve respectively, the guide having a cross-connection in the second direction coinciding with an engine idling adjustment of the actuator and a second cross-connection in the second direction between the feathering range and the governing range, and coinciding with a setting from moderate energy input; and means inhibiting shift of the actuator from the governing range to another range except through the first named cross-connection, and inhibiting motion of the actuator into the governing range except through the second named cross-connection.

8. The combination of an engine; a first source of pressure fluid; a propeller driven by the engine and having blades adjustable to vary propeller pitch; a pressure motor normally serving to adjust the pitch of the blades within a limited working range but capable of moving said blades into extreme feathered and braking positions; a governor responsive to engine speed, supplied with pressure fluid from said source and controlling the motor through said limited working range; means for adjusting said governor to vary the speed at which it exercises control; an energy input controller for the engine; a second source of pressure fluid; a valve having a governing position in which it connects the governor in controlling relation with the motor, and distinct feathering and braking positions in which, respectively, it disconnects the governor and establishes relatively reverse pressure fluid connections between said second source and the motor to actuate the latter to feathering and braking positions respectively; a manually shiftable actuator connected with the input controller, the governor adjusting means, and said valve, and movable in a first direction to operate the controller and the adjusting means, and in a second relatively transverse direction to shift the valve; a guide for said actuator defining three ranges all in the first direction, the ranges establishing the governor, feathering, and braking positions of the valve respectively, the guide having a cross-connection in the second direction coinciding with an engine idling adjustment of the actuator, and a second cross-connection in the second direction between the feathering range and the governing range, and coinciding with a setting for moderate energy input; and means inhibiting shift of the actuator from the governing range to another range except through the first named cross-connection, and inhibiting motion of the actuator into the governing range except through the second named cross-connection.

9. The combination of an engine having an energy input controller; a variable pitch propeller driven thereby and including a double acting fluid pressure motor arranged to adjust the pitch of said propeller between two limits, one of which is a feathered position and the other a reversed-pitch braking position; means for supplying pressure fluid for operating said motor; a governor responsive to engine speed and capable of controlling the admission and exhaust of pressure fluid to and from the motor to adjust propeller pitch; regulatory means for controlling the energy input controller of the engine from an idling position through a series of load positions; valve means capable of being set to establish three conditions, in two of which respectively it establishes direct connections to cause operation of said motor to feathered and to braking positions and suppresses control by the governor, and in the third of which it causes the governor to exercise exclusive control of the motor; a single actuator for said valve means and said regulatory means; guide means for said actuator permitting motion thereof to shift the regulatory means in three similar ranges entailing respectively, the feathering, governing and braking settings of said valve means; and means associated with the guide means serving to limit shift from the governing range to either other range, to paths entailing idling setting of the regulatory means, and to limit return to the governing range so that it can occur only from a point in the feathered range.

10. The combination of an engine having an energy input controller; a variable pitch propeller driven thereby and including a double acting fluid pressure motor arranged to adjust the pitch of said propeller between two limits, one of which is a feathered position and the other a reversed-pitch braking position; means for supplying pressure fluid for operating said motor; a governor responsive to engine speed and capable of controlling the admission and exhaust of pressure fluid to and from the motor to adjust propeller pitch, said governor including adjusting means for setting the governor to control at an idling speed and at least one higher speed suited to operation of the engine under load; regulatory means for controlling the energy input controller of the engine and the adjusting means of the governor in a chosen relation to one another; valve means capable of being set to establish three conditions, in two of which respectively it establishes direct connections to cause operation of said motor to feathered and to braking positions and suppresses control by the governor, and in the third of which it causes the governor to exercise exclusive control of the motor; a single actuator for said valve means and said regulatory means; guide means for said actuator permitting motion thereof to shift the regulatory means in three similar ranges entailing respectively, the feathering, governing and braking settings of said valve means; and means associated with the guide means serving to limit shift from the governing range to either other range, to paths entailing idling setting of the regulatory means, and to limit return to the governing range so that it can occur only from a point in the feathered range.

CURT KELLER.